UNITED STATES PATENT OFFICE.

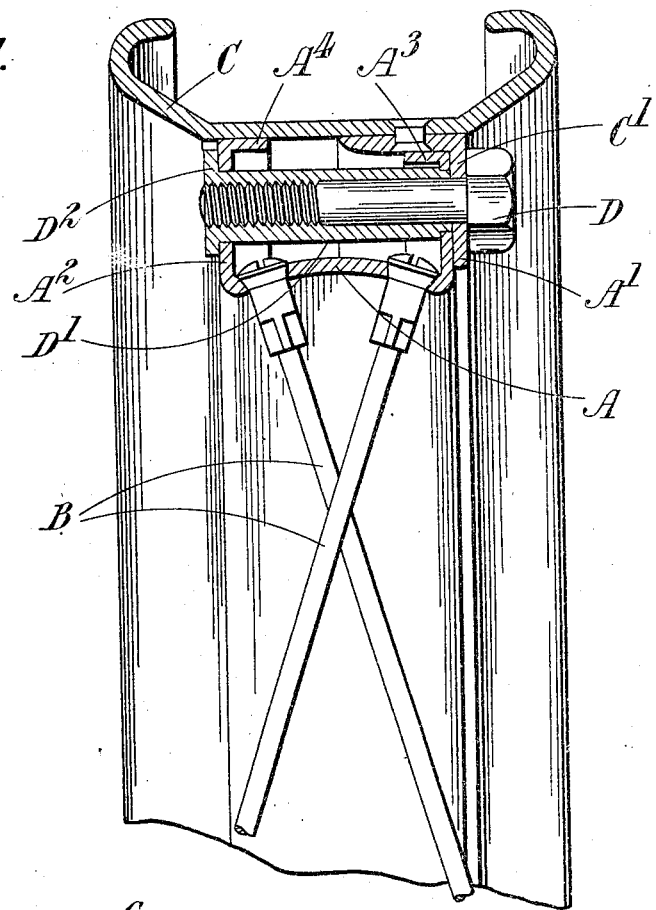
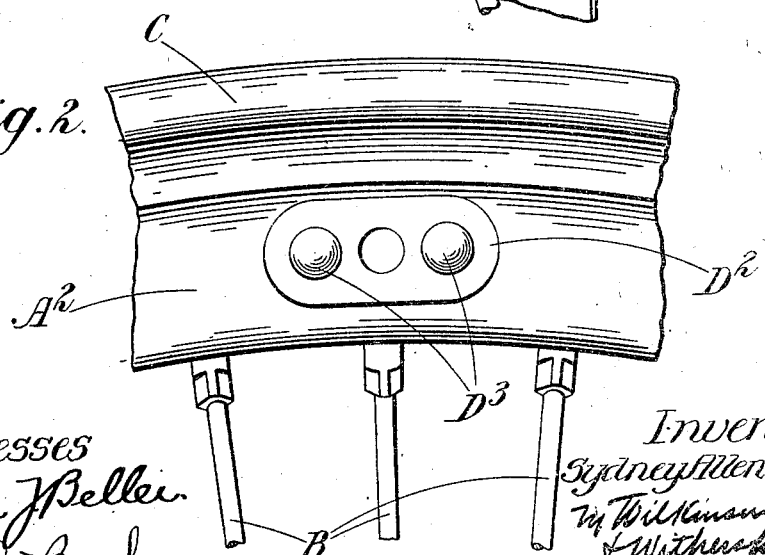

SYDNEY ALLEN CURRIN, OF BRISTOL, ENGLAND.

DEMOUNTABLE RIM FOR RESILIENT WHEELS.

1,054,679.   Specification of Letters Patent.   Patented Mar. 4, 1913.

Application filed April 14, 1911. Serial No. 621,146.

*To all whom it may concern:*

Be it known that I, SYDNEY ALLEN CURRIN, a subject of the King of England, residing at Bristol, England, have invented certain new and useful Improvements in Demountable Rims for Resilient Wheels, of which the following is a specification.

This invention is for improvements in demountable rims for resilient wheels for use with a detachable rim of the type described in the British patent to Gunstone No. 26619, dated 16th November 1909.

An important feature of the invention consists in the combination with a metal fixed rim of channeled cross-section having its open face toward the tire and covered by a detachable tire-carrying rim, of screw-threaded sockets secured in the side flanges across the channeled rim in such manner as to constitute distance pieces whereby the fixed rim is stiffened, bolts being received by the sockets for holding in place the flange of the detachable rim. Preferably the fixed rim comprises a base portion curved transversely with the concave face toward the center of the wheel, such portion receiving the spokes, and outwardly directed flanges whose outer ends are turned toward each other and provide a seating for the detachable rim.

In the accompanying drawings which illustrate one method of carrying out this invention—Figure 1 is a transverse section through the fixed and detachable rims, and Fig. 2 is a side elevational view thereof.

Like letters indicate like parts throughout the drawings.

The fixed rim is of metal preferably rolled and has a base portion A that receives the spokes B. The spokes conveniently are crossed to give lateral rigidity to the wheel and the base is curved transversely, the concave side being toward the center of the wheel. The curve is conveniently such as to give a proper seating for the spokes so that these can lie square to that part of the base from which they extend. The base has outwardly directed side flanges $A^1$ $A^2$ respectively. These are conveniently parallel to each other and together with the base constitute a fixed rim of channeled cross-section whose open side is toward the tire. The outer edges of the flanges are turned over toward each other as shown at $A^3$ and $A^4$ respectively. Conveniently the flange $A^1$ is less deep that the flange $A^2$ as the detachable rim C has secured at one side an angle-piece $C^1$ that renders that side of the rim thicker than the other, so that a stepped seating is necessary. The parts $A^3$ $A^4$ provide a seating for the rim and the angle-piece $C^1$ which extends entirely around the rim provides an inwardly directed flange that can butt against the face of the flange $A^1$ on the fixed rim.

To hold the detachable rim in place, bolts D are employed that pass through the flange $C^1$ and engage screw-threaded sockets $D^1$. These sockets are situated transversely to the fixed rim and extend entirely across the channel formed between the flanges $A^1$ $A^2$. That end of each socket that is toward the inner or car side of the wheel has a head $D^2$ and the other end is reduced to provide a shoulder and is riveted into the flange $A^1$ of the fixed rim. The head $D^2$ may be circular or otherwise shaped but preferably is elongated as shown in Fig. 2 and fixed to the flange $A^2$ by two screws or rivets $D^3$.

It will be seen that in removing the rim the parts to be operated, namely the bolts D and the rim itself are all accessible from the right hand of the wheel (Fig. 1), which is the outer side, and as the sockets $D^1$ are fixed in the rim they cannot get displaced nor is there any need to reach them from the inner side of the wheel as would be the case if they were loose or if the bolts were passed right through the fixed rim and engaged loose nuts on the other side.

It will be seen that the tubular sockets $D^1$ in addition to receiving the bolts, constitute distance pieces between the flanges $A^1$ $A^2$ and tend to considerably stiffen the fixed rim.

The engaging faces of the fixed and removable rims may be turned true to each other and those parts which afford a seating for the removable rim may be parallel to the axle or at an angle thereto according to the formation of the corresponding engaging parts of the rim.

Obviously details of construction may be varied without departing from the spirit of this invention.

What I claim as my invention and desire to secure by Letters Patent is:—

In a demountable wheel rim, the combination of a channel shaped fixed rim having one flange of less depth than the other, a tubular member passing through the flanges of said rim, said tubular member provided with a head engaging the outer side of the rim flange of greater depth and having a shoulder engaging the inner side of the rim flange of less depth, an angular member having a portion projecting inwardly and engaging the edge of said flange of less depth, a tire holding rim fixed to said projecting portion of said angular member and supported on the rim flange of greater depth, and a bolt passing through the other portion of said angular member and threaded in said tubular member for detachably securing the holding rim to the fixed rim, substantially as described.

In testimony whereof I have signed my name to this specification in the presence of two subscribing witnesses.

SYDNEY ALLEN CURRIN.

Witnesses:
 HARRY B. BRIDGES,
 PERCY HEWITT.